US009343861B2

(12) United States Patent
Fry

(10) Patent No.: US 9,343,861 B2
(45) Date of Patent: May 17, 2016

(54) COMMUNICATION MODULE ADAPTOR

(71) Applicant: Tyco Electronics Corporation, Berwyn, PA (US)

(72) Inventor: Charles David Fry, New Bloomfield, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 638 days.

(21) Appl. No.: 13/750,652

(22) Filed: Jan. 25, 2013

(65) Prior Publication Data

US 2014/0211434 A1   Jul. 31, 2014

(51) Int. Cl.
*H05K 5/02* (2006.01)
*H01R 31/06* (2006.01)
*H01R 13/66* (2006.01)
*H04L 12/64* (2006.01)
*H01R 12/72* (2011.01)

(52) U.S. Cl.
CPC ............ *H01R 31/065* (2013.01); *H01R 13/665* (2013.01); *H01R 13/6658* (2013.01); *H04L 12/6418* (2013.01); *H01R 12/72* (2013.01)

(58) Field of Classification Search
CPC ......... G06F 13/10; G06F 13/12; G06F 13/38; G06F 13/42; G06F 1/32; H01R 31/06; G01R 31/00; G05D 3/12
USPC ................ 361/814; 710/62, 316; 439/620.21; 324/402; 700/296, 297
See application file for complete search history.

(56) References Cited

U.S. PATENT DOCUMENTS

| | | | | |
|---|---|---|---|---|
| 4,192,597 A * | 3/1980 | Ting | .................... | G03B 15/05 396/173 |
| 5,491,418 A * | 2/1996 | Alfaro | ................ | G01R 31/007 307/10.1 |
| 9,021,159 B2 * | 4/2015 | Fritchman | ............ | G06F 1/1632 710/62 |
| 2005/0093928 A1 * | 5/2005 | Silverbrook | .............. | B41J 2/01 347/50 |
| 2005/0106941 A1 | 5/2005 | Witchey | | |
| 2007/0019392 A1 * | 1/2007 | Seifried | ................. | H05K 1/117 361/752 |
| 2008/0043404 A1 * | 2/2008 | Frankel | ............... | H01R 31/065 361/600 |
| 2011/0144636 A1 * | 6/2011 | Alexander | ............ | A61B 18/00 606/34 |
| 2011/0264286 A1 | 10/2011 | Park | | |
| 2013/0138861 A1 * | 5/2013 | Terlizzi | .................. | G06F 21/85 710/316 |

(Continued)

FOREIGN PATENT DOCUMENTS

EP  2 525 307 A1  11/2012

OTHER PUBLICATIONS

International Search Report, International Application No. PCT/US2014/010578, International Filng Date Jan. 8, 2014.

*Primary Examiner* — Xiaoliang Chen

(57) ABSTRACT

A communication module adaptor adapted for mating with a device connector of a smart electronic device includes an adaptor circuit having a communication module and an adaptor connector coupled to the adaptor circuit. The communication module has a mating interface differing from a mating interface of the device connector such that the communication module is unable to directly connect to the device connector. The adaptor connector has a mating interface complementary to the mating interface of the device connector for mating with the device connector to electrically connect the communication module adaptor to the smart electronic device. The adaptor circuit electrically connects the adaptor connector and the communication module and control signals are transmitted from a controller of the communication module to the device connector of the smart electronic device via the adaptor connector.

10 Claims, 2 Drawing Sheets

(56) References Cited

U.S. PATENT DOCUMENTS

2013/0238823 A1* 9/2013 Terlizzi ............... G06F 13/102
710/62

2014/0073188 A1* 3/2014 Fritchman ............ G06F 1/1632
439/620.21

2014/0075061 A1* 3/2014 Fritchman ............ G06F 1/1632
710/62

* cited by examiner

COMMUNICATION MODULE ADAPTOR

BACKGROUND OF THE INVENTION

The subject matter herein relates generally to communication module adaptors.

Demand management systems, such as smart grid systems allow utility companies and/or consumers to control energy use and energy cost using smart electronic devices, such as home appliances, electronics, and the like. The smart grid provides technology and systems that allow utility companies and/or consumers to automatically manage energy use and cost. The smart grid system controls when and how the smart electronic devices are operated, such as to manage energy use more efficiently and allows the power companies to maintain grid stability.

Smart grid systems use communication modules coupled to the smart electronic devices via device connectors to control operation of the smart electronic devices. Conventional communication modules and device connectors have many competing standards that define the type of connections, the form factor of the connectors, the communication protocol, and the like. The communication modules are not interchangeable and a communication module manufactured in accordance with one specification is not useable with a smart electronic device manufactured according to a different specification. As a result, communication module manufacturers may not always support all smart electronic device interfaces for a given standard. As such, some smart electronic devices may be unable to connect to the smart grid in a given region.

A need remains for communication module adaptors that allow interconnection and intercommunication between different smart grid system components.

BRIEF DESCRIPTION OF THE INVENTION

In one embodiment, a communication module adaptor adapted for mating with a device connector of a smart electronic device is provided that includes an adaptor circuit, a communication module coupled to the adaptor circuit and an adaptor connector coupled to the adaptor circuit. The communication module has a mating interface differing from a mating interface of the device connector such that the communication module is unable to directly connect to the device connector. The communication module has a controller configured to receive data and control operation of the smart electronic device based on the received data. The adaptor connector has a mating interface complementary to the mating interface of the device connector. The adaptor connector is configured to be mated with the device connector to electrically connect the communication module adaptor to the smart electronic device. The adaptor circuit electrically connects the adaptor connector and the communication module and control signals are transmitted from the controller of the communication module to the device connector of the smart electronic device via the adaptor connector.

Optionally, the adaptor connector may include a plug and a plurality of contacts defining the mating interface of the adaptor connector. The plug and contacts may be configured to be plugged into the device connector. The contacts may be terminated to the adaptor circuit. Data may be transmitted by the contacts. Power may be transmitted by the contacts to power the communication module. Optionally, the communication module adaptor may include a power converter coupled to the adaptor circuit. The power converter may convert the power from the contacts from AC power to DC power to power the communication module.

Optionally, the communication module adaptor may include a protocol converter coupled to the adaptor circuit to convert a protocol of the control signals transmitted from the communication module. The communication module may operate in accordance with a first protocol and the smart electronic device operates in accordance with a second protocol. The control signals may be transmitted from the controller of the communication module to a protocol converter coupled to the adaptor circuit. The protocol converter may convert the control signals from the first protocol to the second protocol and then the control signals may be transmitted from the protocol converter to the device connector of the smart electronic device via the adaptor connector.

Optionally, the communication module may be contained within the adaptor housing. The communication module may includes a circuit card having a card edge defining the mating interface of the communication module. The mating interface of the adaptor connector may include a plug having contacts held in the plug.

Optionally, the communication module adaptor may include a socket connector coupled to the adaptor circuit. The communication module may be plugged into the socket connector to electrically connect the communication module to the adaptor circuit.

Optionally, the controller of the communication module may receive data wirelessly. The controller of the communication module may receive data across the matting interface of the adaptor connector from the smart electronic device.

DETAILED DESCRIPTION OF THE INVENTION

Figure 1:
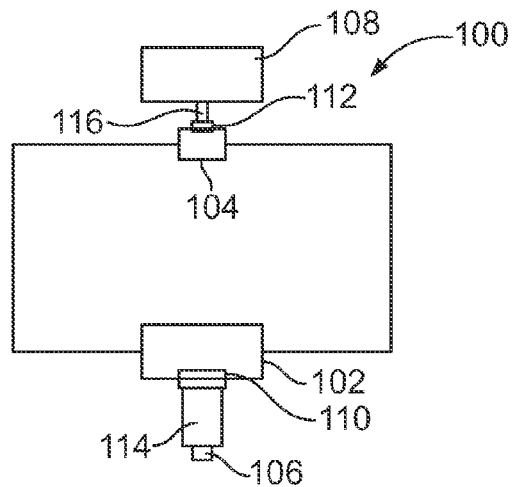
FIG. 1 is a schematic illustration of a smart grid system formed in accordance with an exemplary embodiment.

Embodiments described herein are for use in smart grid systems to allow consumers to control energy use and energy cost using smart electronic devices. The smart grid provides technology and systems that allow consumers to automatically manage their energy use and cost. The smart grid system controls when and how the smart electronic devices are operated, such as to manage energy use more efficiently and enables consumers to save money and power providers to maintain grid stability.

Embodiments described herein provide connections between various communication modules and smart electronic devices. Embodiments described herein may provide interchangeability or interconnectivity of communication modules with various smart electronic devices.

Embodiments described herein provide communication module adaptors that may allow communication modules having different form factors or operating on different communication protocols to interconnect with a smart electronic device. For example, the smart electronic device may be designed to interact with a particular type of communication module having a predetermined form factor and mating interface and configured for use with a predetermined protocol for communication. Other smart electronic devices may be used with communication modules that have a different form factor and mating interface and that use a different protocol for communication. The communication module adaptors described herein allow connection and communication between communication modules and smart electronic devices that have different form factors and mating interfaces or that use different communication protocols. For example, embodiments of communication module adaptors described herein allow interconnectivity of communication modules that may not be particularly designed for a particular smart electronic device to be used with such smart electronic device. The communication module adaptors may change the form factor and mating interface of the communication module for physically connecting to a corresponding device connector of the smart electronic device. The communication module adaptors may change the communication protocol used by the communication module to allow communication with and control of the smart electronic device by communication modules designed to use a different communication protocol.

Embodiments described herein may be used with smart electronic devices, including home appliances, such as water heaters, clothes washers, clothes dryers, thermostats, pool pumps, refrigerators, dishwashers, and the like. Other types of smarts electronic devices include consumer electronics, HVAC equipment, lighting, communications, networking, residential generators, electric vehicles and electric vehicle charging stations, and the like. Communication modules may interface with the smart grid to control one or more operations of the smart electronic devices. The communication modules may communicate wirelessly with a smart grid or may communicate via a wired connection with the smart grid, such as through the smart electronic device itself. The smart grid may have a dynamic pricing structure for the power delivered by the smart grid to the smart electronic devices. Local rate and timing information may be communicated by the smart grid to the communication modules, for adjusting the control of the smart electronic devices. For example, within a consumer's home, smart meters or a home energy management system may be provided. Such smart meters or home energy management system may communicate with the communication module for controlling the smart electronic devices.

FIG. 1 is a schematic illustration of a smart grid system 100 formed in accordance with an exemplary embodiment. In the illustrated embodiment, a first smart electronic device 102 and a second smart electronic device 104 are both connected to the smart grid system 100. Any number of smart electronic devices may be connected to the smart grid system 100. The smart electronic devices 102, 104 are powered by the smart grid system 100. In an exemplary embodiment, data is communicated along the lines of the smart grid system 100 that supplies power to the smart electronic devices 102, 104 in addition to power. The data may be processed to control the operation of the smart electronic devices 102, 104.

In an exemplary embodiment, first and second communication modules 106, 108, are connected to the first and second smart electronic devices 102, 104, respectively. For example, the first and second communication modules 106, 108 are connected to first and second device connectors 110, 112 of the first and second smart electronic devices 102, 104, respectively. In an exemplary embodiment, first and second communication module adaptors 114, 116 are used to connect the contact modules 106, 108 to the device connectors 110, 112. The communication module adaptors 114, 116 allow otherwise unmatable communication modules 106, 108 to be physically coupled to the device connectors 110, 112 to allow communication therebetween.

The communication modules 106, 108 receive data from the smart grid system 100 for controlling the operation of the smart electronic devices 102, 104. Optionally, the communication modules 106, 108 may receive data communicated over the lines of the smart grid system 100 that are hard wired to the smart electronic devices 102, 104. Optionally, the communication modules 106, 108 may receive data from the smart grid system 100 wirelessly as opposed to receiving the data over the lines hardwired to the smart electronic devices 102, 104. Optionally, the communication modules 106, 108 may receive data both wirelessly and across the lines hardwired to the smart electronic devices 102, 104. The communication modules 106, 108 may both transmit and receive data in exemplary embodiments.

In an exemplary embodiment, the first communication module 106 differs from the second communication module 108. For example, the first communication module 106 may have a different form factor than the second communication module 108. The form factor is defined by the outer perimeter of the communication modules 106, 108 at the mating interface thereof. In the illustrated embodiment, the first communication module 106 has a large form factor, while the second communication module 108 has a small form factor. The first communication module 106 may have a different mating interface than the second communication module 108. The mating interface may be used to mechanically and electrically connect the communication module 106, 108 to another component, such as a corresponding connector on the smart electronic device 102, 104. The mating interface may define at least a portion of the form factor.

The first communication module 106 may operate using a different communication protocol than the second communication module 108. For example, the first communication module 106 may be designed to operate under an RS-485 communication protocol while the second communication module 108 is designed to operate in accordance with an SPI communication protocol. Other types of communication modules may be provided that operate in accordance with other types of communication protocols in alternative embodiments.

The device connectors 110, 112 are part of the smart electronic devices 102, 104, and define mating interfaces for the communication modules 106, 108 to the smart electronic devices 102, 104. Optionally, the device connectors 110, 112 may be socket connectors. Other types of connectors may be used in alternative embodiments. The device connectors 110, 112 may be hard wired to the smart electronic devices 102, 104. The device connectors 110, 112 may be mounted to an exterior panel or bezel of the smart electronic devices 102, 104 such that the communication modules 106, 108 may be connected to the device connectors 110, 112 from outside of the smart electronic devices 102, 104.

In the illustrated embodiment, the first device connector 110 has a mating interface configured to be mated with a component having a complimentary mating interface. For example, the first device connector 110 may have a mating interface configured to mate with a particular type of communication module. Such communication module may be adapted to plug directly into the first device connector 110. In the illustrated embodiment, the first communication module 106 is unable to be directly connected to the first device connector 110, because the first communication module 106 has a mating interface that differs from the mating interface of the first device connector 110. For example, the first communication module 106 is a small component having a small form factor and a small mating interface. The first device connector 110 has a relatively large size and large form factor defined by a large mating interface. The first communication module 106 is unable to directly plug into the first device connector 110.

The first communication module adaptor 114 is provided to make an electrical connection between the first device connector 110 and the first communication module 106. The first communication module adaptor 114 has a mating interface that is complementary to the mating interface of the first device connector 110. The first communication module adaptor 114 is configured to be directly plugged into the first device connector 110. The first communication module 106 is electrically connected to the first communication module adaptor 114. The first communication module 106 is electrically connected to the first device connector 110 via the first communication module adaptor 114. The first communication module adaptor 114 changes the form factor and/or communication protocol of the first communication module 106 to allow the first communication module 106 to be plugged into the first device connector 110.

The second communication module adaptor 116 is provided to make an electrical connection between the second device connector 112 and the second communication module 108. The second communication module adaptor 116 has a mating interface that is complementary to the mating interface of the second device connector 112. The second communication module adaptor 116 is configured to be directly plugged into the second device connector 112. The second communication module 108 is electrically connected to the second communication module adaptor 116. The second communication module 108 is electrically connected to the second device connector 112 via the second communication module adaptor 116. The second communication module adaptor 116 changes the form factor and/or communication protocol of the second communication module 108 to allow the second communication module 108 to be plugged into the second device connector 112.

Figure 2:
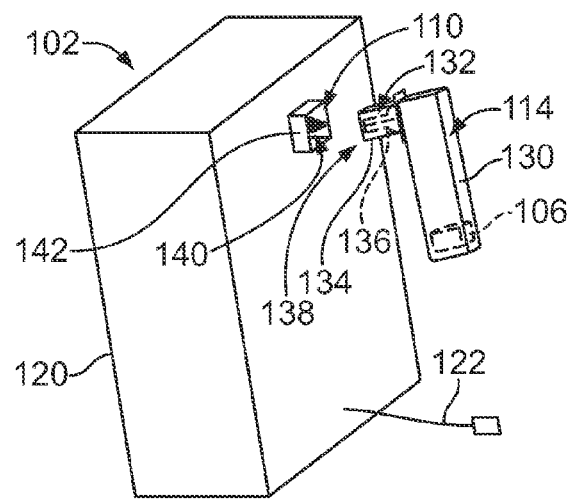
FIG. 2 illustrates a portion of the smart gird system showing a smart electronic device and corresponding communication module adaptor.

FIG. 2 illustrates a portion of the smart gird system 100 showing the smart electronic device 102 and corresponding communication module adaptor 114. In the illustrated embodiment, the smart electronic device 102 is a water heater, however may be any type of smart electronic device in alternative embodiments. The smart electronic device 102 includes the device connector 110. The smart electronic device 102 includes a device housing 120. The device connector 110 extends from the device housing 120. A cord 122 extends from the smart electronic device 102 to connect the smart electronic device 102 to the smart grid system 100 (shown in FIG. 1). Optionally, the cord 122 may be a power cord. The cord 122 may be another type of cord or cable in an alternative embodiment. The cord 122 may supply power and/or data to the smart electronic device 102.

Operation of the smart electronic device 102 may be controlled by the communication module 106 associated with the communication module adaptor 114. The communication module adaptor 114 is used to electrically connect the communication module 106 to the smart electronic device 102. The communication module adaptor 114 includes an adaptor housing 130 used to hold the communication module 106. The adaptor housing 130 may protect the communication module 106. For example, the communication module 106 may be designed to operate in a benign environment, while the smart electronic device 102 may be used in a more hostile environment. The adaptor housing 130 protects the small form factor communication module 106 from the more demanding environment.

The communication module adaptor 114 includes an adaptor connector 132 extending from the adaptor housing 130. The adaptor connector 132 may include a plug 134 used to hold a plurality of contacts 136 (shown in phantom). The plug 134 and contacts 136 define a mating interface 138 of the adaptor connecter 132. The adaptor connector 132 is configured to be plugged into the device connector 110 to electrically connect the communication module adaptor 114 to the smart electronic device 102. Data and/or power may be transmitted from and/or to the smart electronic device 102 via the connection between the adaptor connector 132 and the device connector 110.

The mating interface 138 is a complimentary mating interface to a mating interface 140 of the device connector 110. In the illustrated embodiment, the mating interface 140 of the device connector 110 is a socket having a plurality of contacts 142. The plug 134 is received in the socket such that the contacts 136 are electrically connected to the contacts 142.

Figure 3:
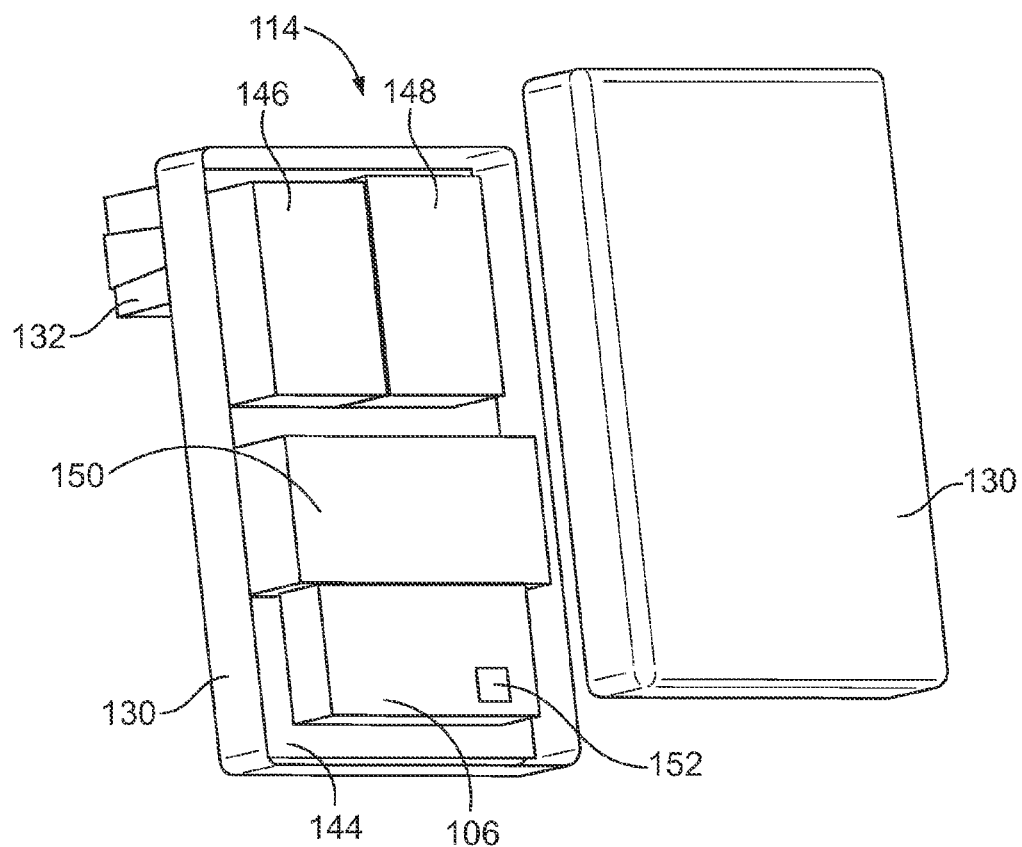
FIG. 3 is an exploded view of the communication module adaptor shown in FIG. 2.

FIG. 3 is an exploded view of the communication module adaptor 114. The communication module adaptor 114 includes the adaptor housing 130 and the adaptor connector 132 extending from the adaptor housing 130. The communication module adaptor 114 includes an adaptor circuit 144 housed within the adaptor housing 130. Optionally, the adaptor circuit 144 may be part of an adaptor circuit board and may be referred to hereinafter as adaptor circuit board 144; however, the adaptor circuit 144 may be provided without a circuit board in alternative embodiments, such as on a flex circuit, on another type of substrate, with wired connections between the components, and the like. The adaptor connector 132 is connected to the adaptor circuit board 144. For example, the contacts 136 may be terminated to the adaptor circuit board 144.

The communication module adaptor 114 includes a power converter 146 coupled to the adaptor circuit board 144 and a protocol converter 148 coupled to the adaptor circuit board 144. The power converter 146 controls power supply to the communication module 106. The communication module adaptor 114 includes a socket connector 150 coupled to the adaptor circuit board 144. The communication module 106 is plugged into the socket connector 150 to electrically connect the communication module 106 to the adaptor circuit board 144. The adaptor circuit board 144 electrically connects the communication module 106 to the adaptor connector 132 by traces or circuits on the adaptor circuit board 144. Other types of electrically components may be part of the communication module adaptor 114. Such electrical components may be coupled to the adaptor circuit board 144 and may affect communication of the communication module adaptor 114 and/or control of the smart electronic device 102.

In an exemplary embodiment, the socket connector 150 defines a card edge connector having a plurality of contacts terminated to the adaptor circuit board 144. The communication module 106 may include a card edge configured to be plugged into a slot the socket connector 150. Other types of connections may be made between the socket connector 150 and the communication module 106 in alternative embodiments.

In an exemplary embodiment, the protocol converter 148 converts a communication protocol of the controls signals transmitted from the communication module 106 to the adaptor connector 132. For example, the protocol converter 148 may convert the control signals from one communication protocol to a different communication protocol. For example, control signals transmitted by the communication module 106 may be converted by the protocol converter 148 to a different communication protocol prior to being transmitted to the adaptor connector 132 and the device connector 110. Optionally, control signals received at the adaptor connector 132 from the device connector 110 may be converted from one communication protocol to a different communication protocol prior to transmitting the control signals to the communication module 106.

In an exemplary embodiment, the protocol converter 148 includes a micro controller for controlling the operation thereof and/or for converting the control signals. The protocol converter 148 may include one or more drivers, filters, amplifies, or other electronic components therein. The protocol converter 148 allows communication between the communication module 106 and the smart electronic device 102 when the communication module 106 communicates at different protocol than the smart electronic device 102. For example, the protocol converter 148 may convert control signals communicated in accordance with SPI communication protocol into control signals configured to be communicated in accordance with the RS-485 communication protocol, and vice versa.

The power converter 146 is used to provide power to the communication module 106. For example, the power converter 146 may convert a power supply from the smart electronic device 102 to a power supply usable by the communication module 106. For example, the power converter 146 may convert 110-240 AC line voltage to 5 volt DC for the communication module 106.

The communication module 106 includes a controller 152 configured to receive data and control operation of the smart electronic device 102. The controller 152 may receive the data wirelessly or by some other communication method or means. The controller 152 may receive data directly from the smart electronic device 102 via the connection between the adaptor connector 132 and the device connector 110. The controller 152 may have hardware and/or software for controlling the operation of the smart electronic device 102. The controller 152 may have hardware and/or software for generating control signals which are transmitted to the smart electronic device 102.

The communication module 106 may control the operation of the smart electronic device 102 in accordance with predefined control algorithms. The control algorithms may be set by the consumer or user, or alternatively the control algorithms may be factory preset algorithms. The control algorithms may be changed or updated over time, such as based on information received by the communication module 106. The communication module 106 may receive different types of information, which the control module 106 uses to control operations of the smart electronic device 102. For example, the control module 106 may receive information relating to the price of energy, the amount of energy consumption on the smart grid, information relating to the status of the smart electronic device 102, information relating to the status of the smart grid, and the like.

Figure 4:
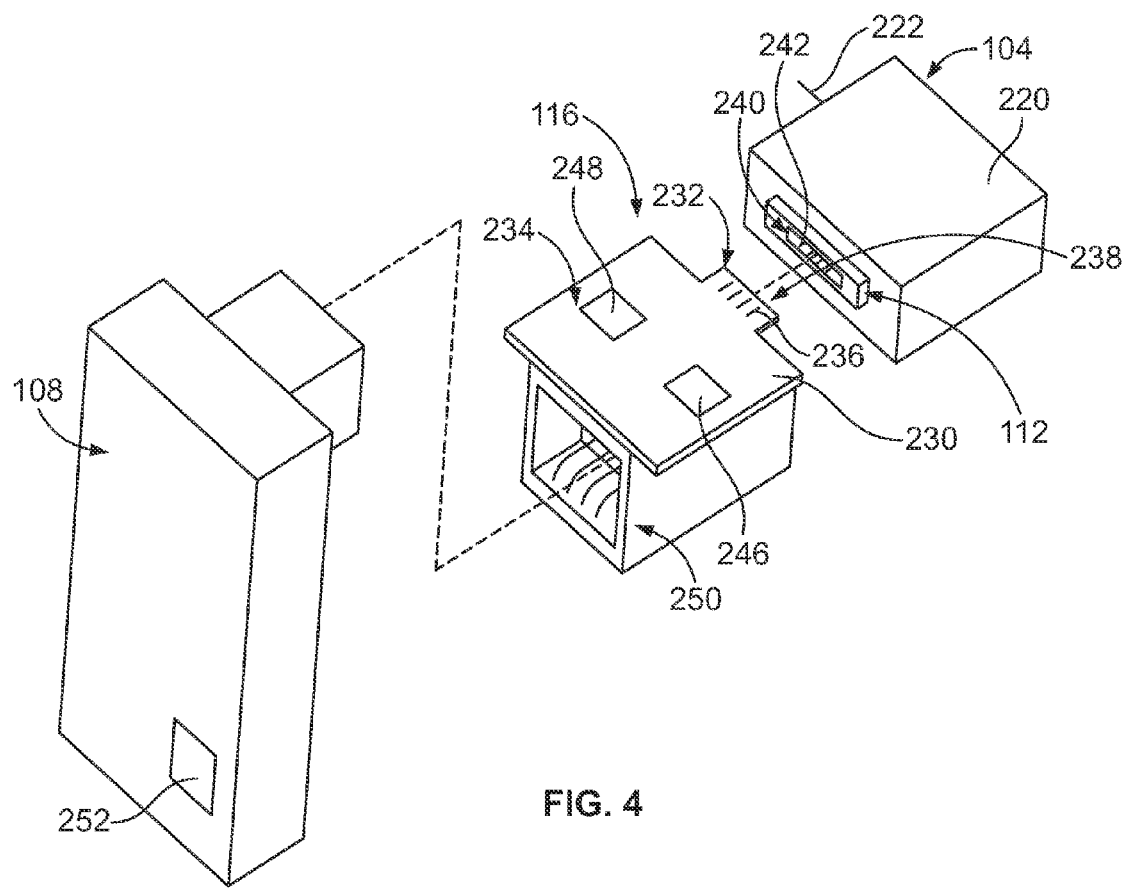
FIG. 4 illustrates a portion of the smart gird system showing a smart electronic device and corresponding communication module adaptor.

FIG. 4 illustrates a portion of the smart gird system 100 showing the smart electronic device 104 and corresponding communication module adaptor 116. In the illustrated embodiment, the smart electronic device 104 is a thermostat, however may be any type of smart electronic device in alternative embodiments. The smart electronic device 104 includes the device connector 112. Being a relatively small smart electronic device, the device connector 112 associated therewith tends to have a small form factor. The smart electronic device 104 includes a device housing 220. The device connector 112 extends from the device housing 220. A cord 222 extends from the smart electronic device 104 to connect the smart electronic device 104 to the smart grid system 100 (shown in FIG. 1). Optionally, the cord 222 may be a signal cord, which may communication directly with another device, such as an HVAC unit. The cord 222 may be another type of cord or cable in an alternative embodiment. The cord 222 may supply data and/or power to the smart electronic device 104.

Operation of the smart electronic device 104 may be controlled by the communication module 108 associated with the communication module adaptor 116. The communication module adaptor 116 is used to electrically connect the communication module 108 to the smart electronic device 104. The communication module adaptor 116 includes an adaptor housing 230 used to hold the other components thereof. In the illustrated embodiment, the adaptor housing is defined by a substrate, to which other components are mounted and held. In alternative embodiments, the adaptor housing 230 may be a case that surrounds the other components of the communication module adaptor 116

The communication module adaptor 116 includes an adaptor connector 232 extending from the adaptor housing 230. In the illustrated embodiment, the adaptor connector 232 is a card edge of an adaptor circuit board 234, which has a plurality of contacts 236. The adaptor circuit board 234 and contacts 236 define a mating interface 238 of the adaptor connecter 232. The adaptor connector 232 is configured to be plugged into the device connector 112 to electrically connect the communication module adaptor 116 to the smart electronic device 104. Data and/or power may be transmitted from and/or to the smart electronic device 104 via the connection between the adaptor connector 232 and the device connector 112.

The mating interface 238 is a complimentary mating interface to a mating interface 240 of the device connector 112. In the illustrated embodiment, the mating interface 240 of the device connector 112 is a card edge slot having a plurality of contacts 242. The card edge is received in the card edge slot such that the contacts 236 are electrically connected to the contacts 242.

The communication module adaptor 116 may include a power converter 246 coupled to the adaptor circuit board 234 and a protocol converter 248 coupled to the adaptor circuit board 234. The communication module adaptor 116 includes a socket connector 250 coupled to the adaptor circuit board 234. Other types of electrically components may be part of the communication module adaptor 116.

The communication module 108 is plugged into the socket connector 250 to electrically connect the communication module 108 to the adaptor circuit board 234. The adaptor circuit board 234 electrically connects the communication module 108 to the adaptor connector 232 by traces or circuits on the adaptor circuit board 234. In the illustrated embodiment, the communication module 108 has a form factor and mating interface that is too large for directly connecting to the device connector 112. The communication module adaptor 116 converts the form factor and/or the communication protocol to allow the communication module 108 to be electrically connected to the smart electronic device 104.

The communication module 108 includes a controller 252 configured to receive data and control operation of the smart electronic device 104. The controller 252 may receive the data wirelessly or by some other communication method or means. The controller 252 may receive data directly from the smart electronic device 104 via the connection between the adaptor connector 232 and the device connector 112.

Figure 5:
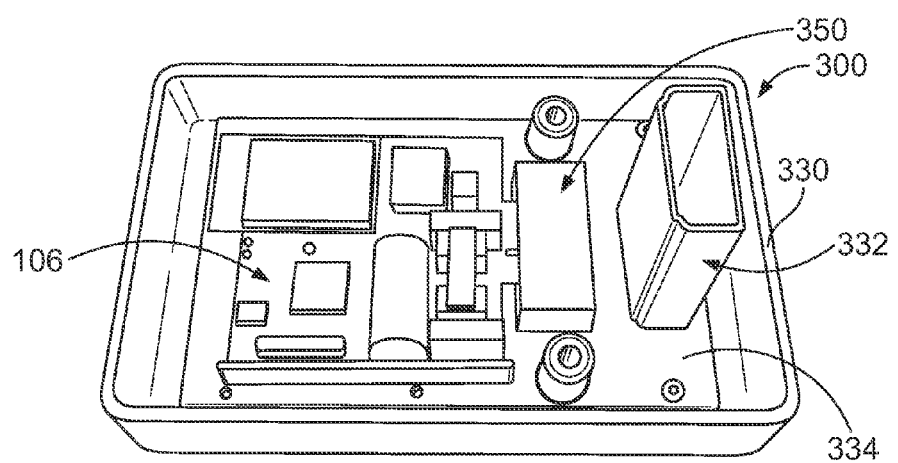
FIG. 5 illustrates another communication module adaptor formed in accordance with an exemplary embodiment.

FIG. 5 illustrates another communication module adaptor 300 formed in accordance with an exemplary embodiment. The communication module adaptor 300 is intermediate in form factor, as compared to the large form factor of the communication module adaptor 114 (shown in FIG. 1) and the small form factor of the communication module adaptor 116 (shown in FIG. 1). The communication module adaptor 300 is used to electrically connect the communication module 106 to a smart electronic device that is designed for use with a communication module having the form factor of the communication module adaptor 300. The communication module adaptor 116 includes an adaptor housing 330 used to hold the other components thereof.

The communication module adaptor 116 includes an adaptor connector 332 extending from the adaptor housing 330. An adaptor circuit board 334 is held in the adaptor housing 330. The communication module adaptor 116 includes a socket connector 350 coupled to the adaptor circuit board 334. In contrast to the communication module adaptor 114, the communication module adaptor 300 does not include a power converter or a protocol converter. Other types of electrically components may be part of the communication module adaptor 300.

The communication module 106 is plugged into the socket connector 350 to electrically connect the communication module 106 to the adaptor circuit board 334. The adaptor circuit board 334 electrically connects the communication module 106 to the adaptor connector 332 by traces or circuits on the adaptor circuit board 334.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A communication module adaptor adapted for mating with a device connector of a smart electronic device, the communication module adaptor comprising:
   an adaptor housing;
   an adaptor circuit board housed within the adaptor housing, the adaptor circuit board having an adaptor circuit;
   a communication module housed within the adaptor housing, the communication module being electrically coupled to the adaptor circuit, the communication module having a mating interface differing from a mating interface of the device connector such that the communication module is unable to directly connect to the device connector, the communication module having a controller configured to receive data from a smart electrical grid system and control operation of the smart electronic device based on the received data from the smart electrical grid system; and
   an adaptor connector within the adaptor housing, the adaptor connector being electrically coupled to the adaptor circuit, the adaptor connector having a mating interface complementary to the mating interface of the device connector, the adaptor connector being configured to be mated with the device connector to electrically connect the communication module adaptor to the smart electronic device;
   wherein the adaptor circuit electrically connects the adaptor connector and the communication module, and wherein control signals based on the received data from the smart electrical grid system are transmitted from the controller of the communication module to the device connector of the smart electronic device via the adaptor connector to control operation of the smart electronic device based on the received data from the smart electronic grid system.

2. The communication module adaptor of claim 1, wherein the adaptor connector comprises a plug and a plurality of contacts defining the mating interface of the adaptor connector, the plug and contacts being configured to be plugged into the device connector, the contacts being terminated to the adaptor circuit, data being transmitted by the contacts.

3. The communication module adaptor of claim 2, wherein power is transmitted by the contacts to power the communication module.

4. The communication module adaptor of claim 3, further comprising a power converter coupled to the adaptor circuit, the power converter converting the power from the contacts from AC power to DC power to power the communication module.

5. The communication module adaptor of claim 1, further comprising a protocol converter coupled to the adaptor circuit housed within the adaptor housing to convert a protocol of the control signals transmitted from the communication module.

6. The communication module adaptor of claim 1, wherein the communication module operates in accordance with a first protocol and the smart electronic device operates in accordance with a second protocol, and wherein the control signals are transmitted from the controller of the communication module to a protocol converter coupled to the adaptor circuit housed within the adaptor housing, the protocol converter converting the control signals from the first protocol to the second protocol and then the control signals being transmitted from the protocol converter to the device connector of the smart electronic device via the adaptor connector.

7. The communication module adaptor of claim 1, wherein the communication module includes a circuit card having a card edge defining the mating interface of the communication module, the mating interface of the adaptor connector comprising a plug having contacts held in the plug.

8. The communication module adaptor of claim 1, further comprising a socket connector coupled to the adaptor circuit, the communication module being plugged into the socket connector to electrically connect the communication module to the adaptor circuit.

9. The communication module adaptor of claim 1, wherein the controller of the communication module receives data wirelessly.

10. The communication module adaptor of claim 1, wherein the controller of the communication module receives data from the smart electronic grid system across the mating interface of the adaptor connector from the smart electronic device.

\* \* \* \* \*